US011599426B2

(12) United States Patent
Jeansonne et al.

(10) Patent No.: US 11,599,426 B2
(45) Date of Patent: Mar. 7, 2023

(54) RECOVERY VIA BACKUPS OF RECOVERY INFORMATION (71) Applicant: Hewlett-Packard Development Company, L.P., Spring, TX (US)

(72) Inventors: Jeffrey Kevin Jeansonne, Spring, TX (US); Rosilet Retnamoni Braduke, Spring, TX (US); Wei Ze Liu, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/052,411

(22) PCT Filed: Feb. 11, 2019

(86) PCT No.: PCT/US2019/017523
§ 371 (c)(1),
(2) Date: Nov. 2, 2020

(87) PCT Pub. No.: WO2020/167287
PCT Pub. Date: Aug. 20, 2020

(65) Prior Publication Data
US 2021/0357298 A1 Nov. 18, 2021

(51) Int. Cl.
*G06F 11/14* (2006.01)
*G06F 9/4401* (2018.01)
*G06F 21/44* (2013.01)

(52) U.S. Cl.
CPC ........ *G06F 11/1469* (2013.01); *G06F 9/4406* (2013.01); *G06F 11/1415* (2013.01);
(Continued)

(58) Field of Classification Search
CPC ...... G06F 11/1469; G06F 8/65; G06F 9/4406; G06F 11/1415; G06F 11/1417;
(Continued)

(56) References Cited

U.S. PATENT DOCUMENTS

5,295,258 A 3/1994 Jewett et al.
7,849,454 B2 12/2010 Lambert et al.
(Continued)

*Primary Examiner* — Bryce P Bonzo
*Assistant Examiner* — Michael Xu
(74) *Attorney, Agent, or Firm* — Knobbe, Martens, Olson & Bear, LLP (57) ABSTRACT An example computing device includes a controller to control operation of a firmware subsystem of the computing device. The controller is separate from a main processor of the computing device. A memory stores subsystem data that is useable by the controller. The subsystem data includes recovery information executable by the controller to initiate recovery of the subsystem. The computing device further includes recovery coordination instructions. The recovery coordination instructions determine integrity of the recovery information as stored on the memory and. In response to determining that the recovery information lacks integrity, the recovery coordination instructions initiate recovery of the firmware subsystem using a backup of the recovery information and perform recovery of the firmware subsystem using an update to the firmware subsystem.

14 Claims, 6 Drawing Sheets (52) U.S. Cl.
CPC ...... *G06F 11/1417* (2013.01); *G06F 11/1433* (2013.01); *G06F 11/1458* (2013.01); *G06F 21/44* (2013.01); *G06F 2201/82* (2013.01)

(58) Field of Classification Search
CPC .. G06F 11/1433; G06F 11/1458; G06F 21/44; G06F 2201/82; G06F 9/4401; G06F 8/654
See application file for complete search history.

(56) References Cited

U.S. PATENT DOCUMENTS

| | | | |
|---|---|---|---|
| 9,081,954 B2 | 7/2015 | Forristal | |
| 9,542,195 B1* | 1/2017 | Astarabadi | G06F 11/1469 |
| 2007/0169088 A1* | 7/2007 | Lambert | G06F 11/0709 |
| | | | 717/168 |
| 2009/0172639 A1 | 7/2009 | Natu et al. | |
| 2010/0281297 A1 | 11/2010 | Jibbe et al. | |
| 2013/0013905 A1* | 1/2013 | Held | G06F 21/572 |
| | | | 713/2 |
| 2013/0326404 A1 | 12/2013 | Brooks et al. | |
| 2015/0277930 A1* | 10/2015 | Sarangdhar | G06F 21/572 |
| | | | 713/2 |
| 2018/0088963 A1* | 3/2018 | Arora | G06F 9/4406 |
| 2018/0096154 A1 | 4/2018 | Shivanna et al. | |
| 2019/0163497 A1* | 5/2019 | Samuel | G06F 11/1469 |
| 2019/0286436 A1* | 9/2019 | Liu | G06F 8/654 |
| 2020/0201714 A1* | 6/2020 | Montero | G06F 11/1469 |

\* cited by examiner

RECOVERY VIA BACKUPS OF RECOVERY INFORMATION

BACKGROUND

Computing devices, such as desktop computers, notebook computers, servers, tablet computers, and smartphones, often include firmware stored in non-volatile memory. When a computing device is booted, the firmware may initialize hardware of the computing device and start runtime services that may be used by an operating system or application executed by the computing device.

Various mechanisms may be provided to firmware to mitigate erroneous or unauthorized modification, which could allow a malicious person or program to take control of a computing device, render a computing device inoperable, or similar.

DETAILED DESCRIPTION

Examples of firmware include hardware-initialization firmware such as a Basic Input/Output System (BIOS) firmware and Unified Extensible Firmware Interface (UEFI) firmware. Firmware may be implemented as a set of instructions stored in a non-volatile memory. A computing device may maintain a backup copy of firmware to be used for recovery purposes when lack of integrity in the firmware is detected. However, the backup and recovery of such firmware may be confounded by the proprietary nature of various firmware subsystems of a computing device and by limited storage space to securely store firmware backups.

For example, the central processing unit (CPU), platform control chipset, baseboard or motherboard, and memory of a computing device may be made by different companies. It may be the case that a component contains proprietary information. For example, a component that provides management functions to a computing device, such as remote management services, may contain information that the provider of the component wishes to keep obscure or secret for security or other reasons. Such proprietary information may be protected from being accessed or copied by other systems. Further, storing a secure backup of a full copy of each example of such firmware may be impractical where the size of the backups would be especially large and thus cumbersome to securely store.

Such a component may be provided as an autonomous management firmware subsystem, in the form of a chipset or system-on-chip, that is separate from a main processor (e.g., CPU) of a computing device. An example of such a management firmware subsystem may include a subsystem controller and a subsystem data accessible to the subsystem controller. A subsystem controller may execute a program defined by the subsystem data to carry out the functions of the subsystem. Example management firmware subsystem functions include boot protection, remote access or management services, monitor/control of device physical properties (e.g., cooling fan speed, CPU/motherboard temperature, CPU/motherboard voltage, etc.), network functionality, security functionality, copy protection, digital rights management, and similar.

A management firmware subsystem may be separate and distinct from hardware-initialization firmware that initializes a CPU or main processor of a computing device. A management firmware subsystem may be autonomously executed by a controller separate from the CPU or main processor, and execution of the management firmware subsystem may be prerequisite to operation of the CPU or main processor. Hardware-initialization firmware may be executed by the same main processor that executes an operating system and applications. A main processor may not be able to have access to a memory device or partition that stores a management firmware subsystem. While a management firmware subsystem and other firmware may be separate and distinct, there may be overlap in functionality.

A computing device may be provided which includes recovery coordination instructions to determine integrity of recovery information stored in memory of the computing device and, in response to determining that the recovery information lacks integrity, initiates recovery of the firmware subsystem using a backup of the recovery information, and performs recovery of the firmware subsystem using an update to the firmware subsystem. The recovery may be performed to completion. Recovery information may include recovery instructions and related data to initialize recovery of the firmware subsystem. The recovery information may lack integrity where the recovery instructions or related data are missing, unexpectedly modified, non-operational, or otherwise show an indication of a fault or security attack affecting the recovery instructions or related data. Thus, the capability of a firmware subsystem to be recovered may be protected. Further, since only a copy of information sufficient to initiate disaster recovery is stored, and an update to the firmware is used to perform or complete the full recovery, memory savings is achieved, and the access of proprietary information may be avoided.

The firmware subsystem may be checked for a status of an update during booting of the computing device. Where a new update is available, the update may be applied, and a backup may be stored for use in a later recovery process. Upon entry to restart, hibernation, or shut down of the computing device, firmware subsystem and firmware subsystem update status flags may be checked, and various update and recovery procedures may be prepared for the next boot process.

Figure 1:
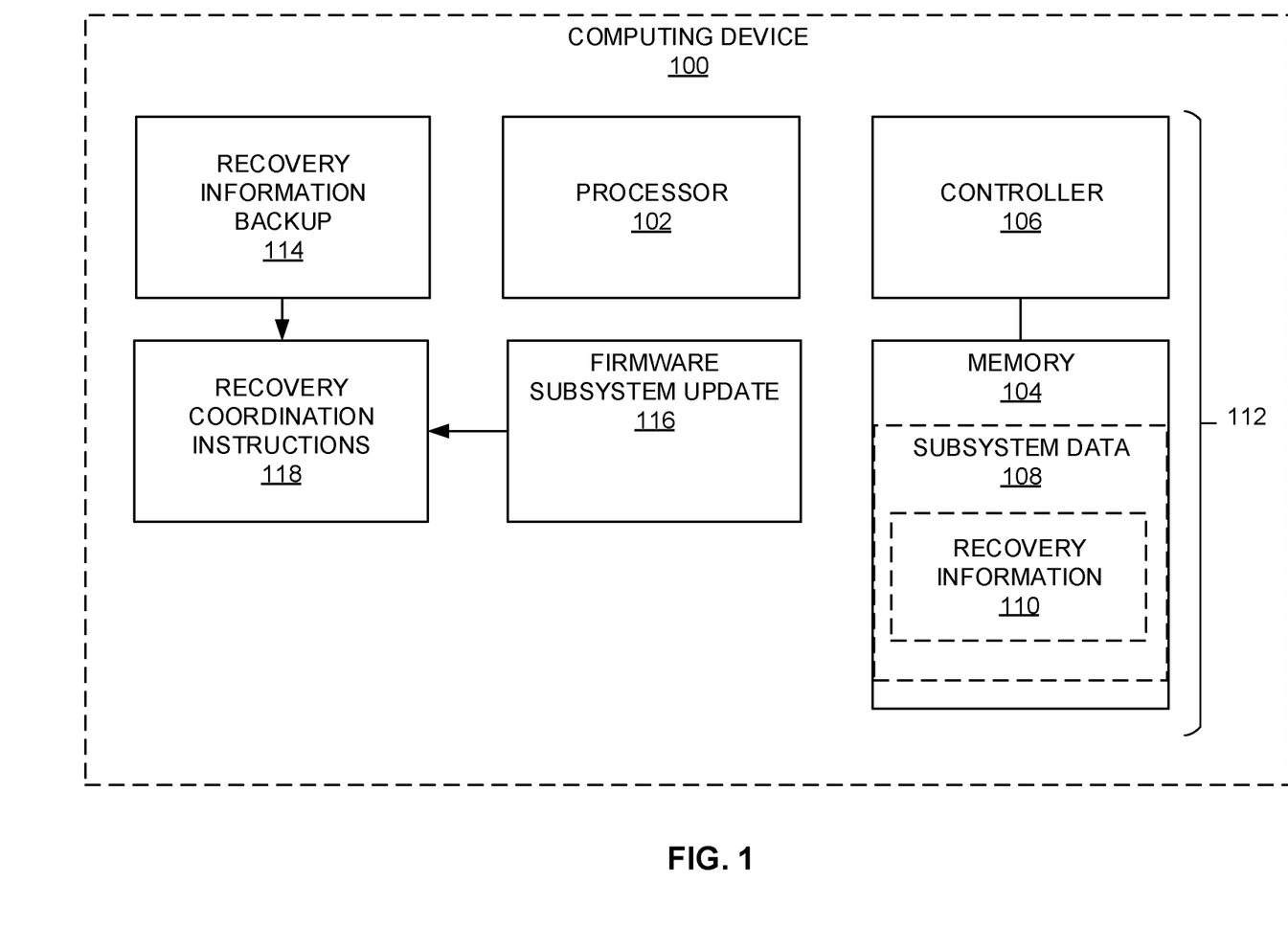
FIG. 1 is a schematic diagram of an example computing device including a firmware subsystem that may be recovered using a backup of recovery information and a firmware subsystem update.

FIG. 1 is a schematic diagram of an example computing device 100. The computing device 100 may be a desktop computer, server, notebook computer, tablet computer, smartphone, or similar device.

The computing device 100 includes a main processor 102, memory 104, and a controller 106. The computing device 100 may include other components, not illustrated for sake of clarity, such as a user interface device (e.g., keyboard, display, touchscreen, etc.), mass storage device (e.g., hard drive, solid-state drive, etc.), power supply, and the like.

The main processor 102 may be referred to as a CPU and may execute hardware-initialization firmware (e.g., BIOS, UEFI), an operating system, and application programs.

The memory 104 is a non-transitory computer-readable medium that includes non-volatile memory, such as Electrically Erasable Programmable Read-Only Memory (EE-PROM), flash memory, or similar type of memory that is capable of preserving content without external power. The memory 104 stores subsystem data 108 and recovery information 110. The memory 104 may also store hardware-initialization firmware or other information.

The controller 106 may be a microcontroller, microprocessor, or similar device. The controller 106 is separate from the main processor 102. The controller 106 and processor 102 may have different architectures and different instruction sets. In some examples, the controller 106 has less capability than the main processor 102.

The controller 106 and the main processor 102 execute respective sets of instructions separately. Instruction execution by the controller 106 and the main processor 102 may occur at different times or simultaneously. The controller 106 may be autonomous from the main processor 102. For example, the controller 106 may operate normally when the main processor 102 is in a sleep mode or hibernate mode or is off.

Access by the main processor 102 to instructions intended for the controller 106 may be mitigated by restricting access to a portion of the memory 104 where the instructions intended for the controller 106 are stored. This may be achieved by a descriptor or partition table of the memory 104 that the main processor 102 refers to when accessing the memory 104.

The controller 106, subsystem data 108, and recovery information 110 may form a firmware subsystem 112 whose operation is controlled by the controller 106. The firmware subsystem 112 may be an autonomous management firmware subsystem. The subsystem data 108 may include a set of subsystem instructions executable by the controller 106 to implement the functionality of the firmware subsystem 112 as well as supporting data. For example, the subsystem data 108 may include a set of subsystem instructions that implements a remote management service, which allows an organization to remotely manage a large number of computing devices 100, or any of the other example functionality described herein with respect to a management firmware subsystem.

The recovery information 110 includes recovery instructions and related data to initialize recovery of the firmware subsystem to correct for error, intrusion, or other event that may affect the firmware subsystem 112. For example, the recovery information 110 may detect a fault in the subsystem data 108 that interferes with initialization of the computing device 100. The recovery information 110 may recover the firmware subsystem 112 in a variety of ways. For example, the recovery information 110 may detect a discrepancy in the subsystem data 108 and restore the subsystem data 108 with a backup of the subsystem data.

The computing device 100 further includes recovery information backup 114, firmware subsystem update 116, and recovery coordination instructions 118, which may be stored in a non-volatile memory of the computing device 100, such as memory 104, or another memory. The recovery coordination instructions 118 may be executable by the main processor 102 or a by different processor/controller of the computing device 100.

The recovery information backup 114 is a copy of some or all of the recovery information 110. The recovery information backup 114 may include a portion of instructions from the recovery information 110 sufficient to initialize recovery of the firmware subsystem 112. The recovery information backup 114 may exclude proprietary information that is protected on firmware subsystem 112. The recovery information backup 114 may be captured at time of manufacture of the computing device 100, as will be discussed in greater detail below.

The firmware subsystem update 116 is an update to some or all of the subsystem data 108. The firmware subsystem update 116 may exclude proprietary information that is protected on firmware subsystem 112. The firmware subsystem update 116 may be larger in memory, and in some examples significantly larger in memory, than the recovery information backup 114.

The recovery coordination instructions 118 include instructions to determine integrity of the recovery information 110 as stored on the memory 104. The recovery coordination instructions may determine integrity of the recovery information before the computing device is reset, shut down, or hibernated, as discussed in greater detail below. The recovery coordination instructions 118 further include instructions to, in response to determining that the recovery information 110 lacks integrity, initiate recovery of the firmware subsystem 112 using the recovery information backup 114, and perform recovery of the firmware subsystem 112 using the firmware subsystem update 116.

The recovery coordination instructions 118 may update the backup of the recovery information 110 when the subsystem data 108 is updated, as discussed in greater detail below.

Figure 2:
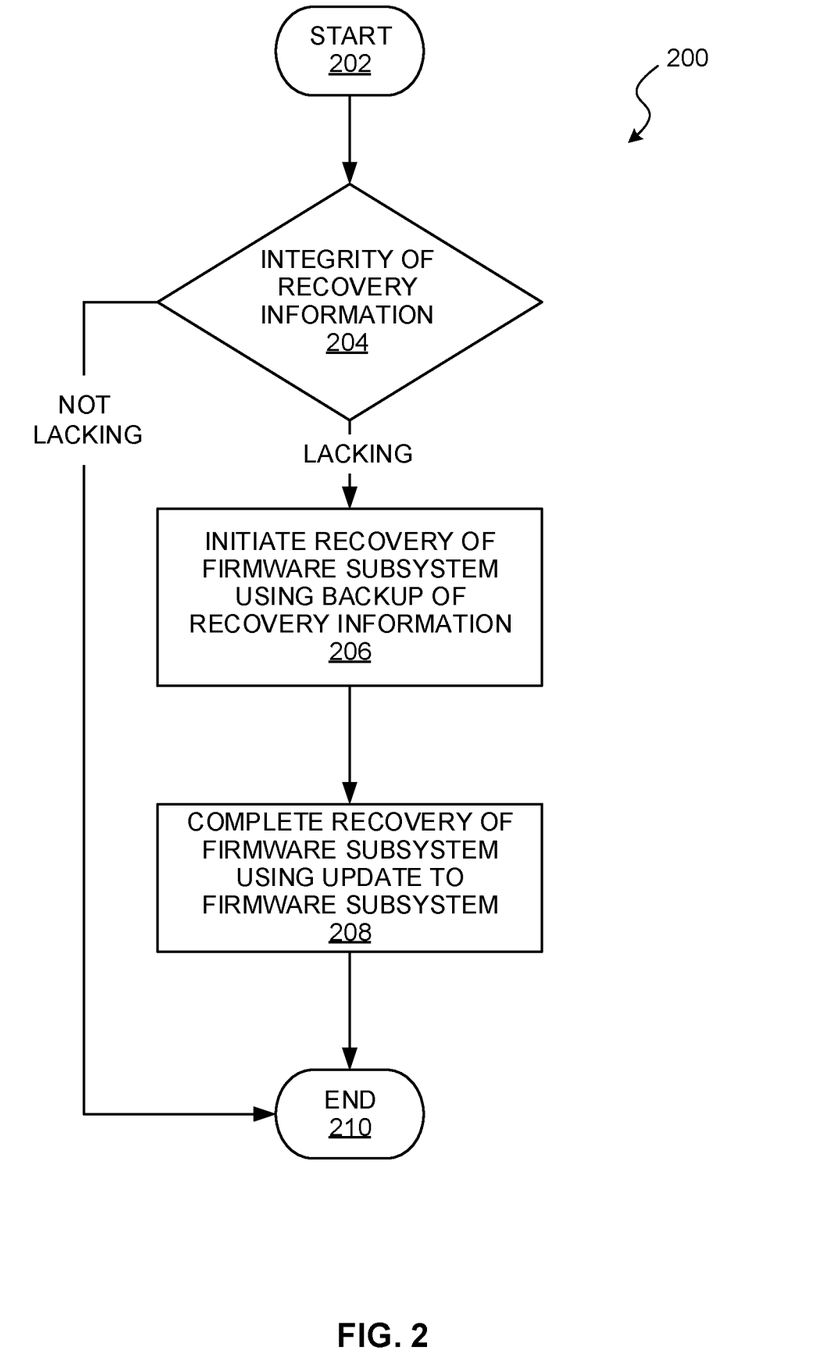
FIG. 2 is a flowchart of an example method to recover a firmware subsystem using a backup of recovery information and a firmware subsystem update.

FIG. 2 is a flowchart of an example method 200 to recover a firmware subsystem using a backup of recovery information and a firmware subsystem update. The method 200 may be performed by a computing device as discussed herein, such as the computing device 100 of FIG. 1, or the computing device 300 of FIG. 3. The method 200 may be embodied by a set of executable instructions that may be stored in a non-transitory computer-readable medium. The method begins at block 202.

At block 204, integrity of recovery information is determined. Integrity of the recovery information may be determined to be lacking, for example, where there is an error in execution of recovery information of the computing device, a scan of the recovery information detects a discrepancy between expected recovery information and actual recovery information is corrupted. Lack of integrity of the recovery information may be indicative of manipulation of the recovery information or a security attack. If it is determined that the recovery information have integrity, then the method 200 is ended at block 210 and the firmware subsystem is considered to be capable of running normally. If it is determined that the recovery information lacks integrity, then recovery of the firmware subsystem is initiated.

At block 206, recovery of the firmware subsystem is initiated using a backup of the recovery information. After recovery of the firmware subsystem is initiated, recovery of the firmware subsystem is performed using an update to the firmware subsystem at block 208. The recovery may be performed to completion. After performance of the recovery of the firmware subsystem, the method 200 ends at block 210.

The method 200 may be repeated continually during boot of the computing device, during normal operation of the computing device, during a low power state of the computing device, or a combination of such.

Figure 3:
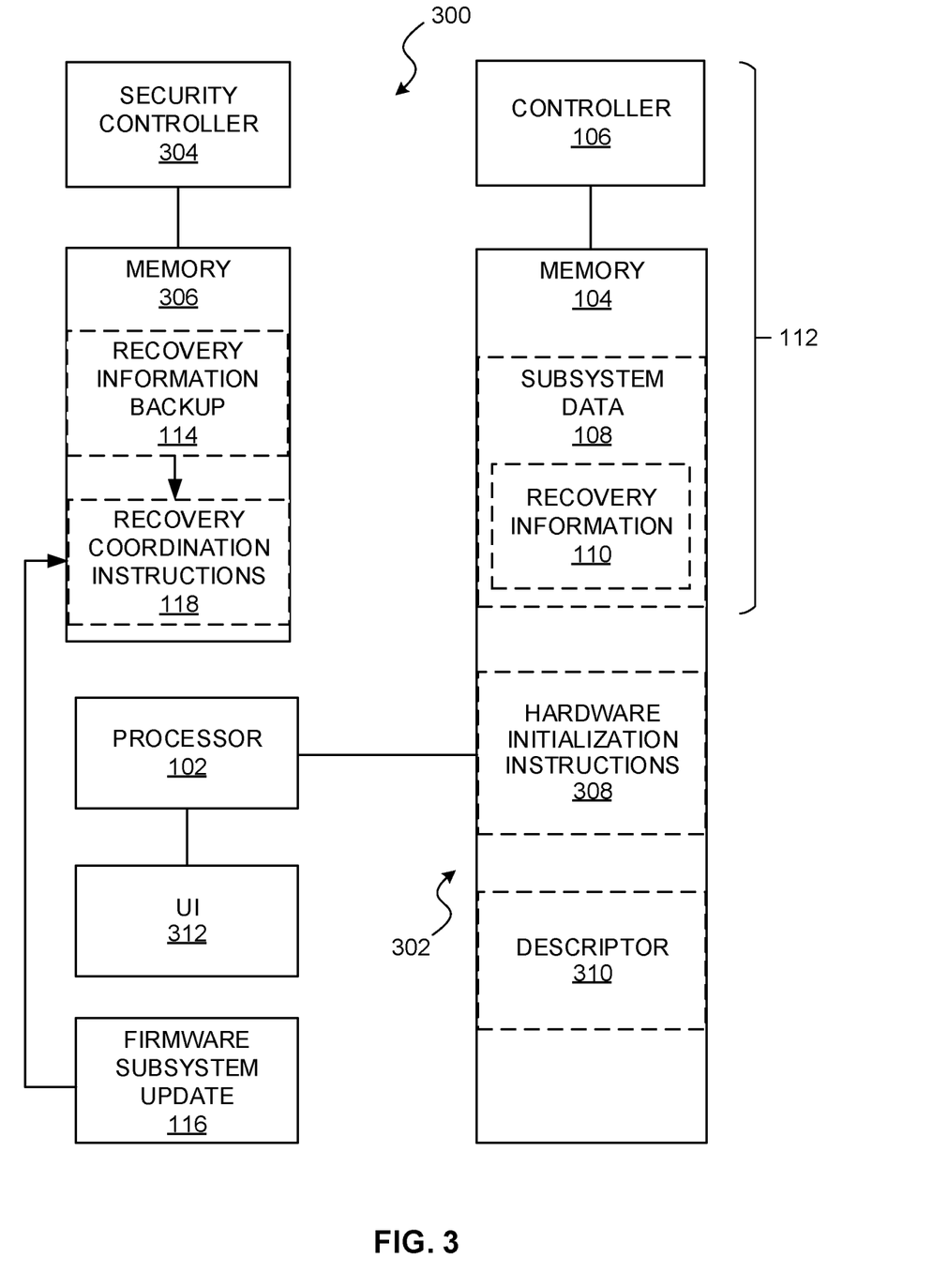
FIG. 3 is a schematic diagram of another example computing device including a firmware subsystem that may be recovered using a backup of recovery information and a firmware subsystem update, the backup of the recovery information stored on secure memory isolated from a main processor of the computing device.

FIG. 3 is a schematic diagram of another example computing device 300. Features and aspects of the other devices and systems described herein can be used with the computing device 300. Like numerals identify like components and redundant description is omitted for sake of clarity.

The computing device 300 includes a main processor 102, non-volatile memory 104, a firmware subsystem 112, a hardware-initialization firmware subsystem 302, a security controller 304, and secure memory 306. The firmware subsystem 112 may include a device management firmware subsystem to manage the hardware-initialization firmware subsystem 302.

The firmware subsystem 112 includes a controller 106 and a portion of the memory 104. Subsystem data 108 of the firmware subsystem 112 stored in memory 104 may include a program and related data. The subsystem data 108 may include management firmware subsystem data. The firmware subsystem 112 may provide security and management functions to the computing device 300, such as remote management services, remote wipe, encryption, digital rights management, and similar. The firmware subsystem 112 may provide platform configuration services at bootup prior to main processor 102 execution. Further, recovery information 110 which is sufficient to initialize a recovery process of the firmware subsystem 112 may also be stored in memory 104.

The hardware-initialization firmware subsystem 302 includes hardware-initialization firmware instructions 308 stored in the memory 104 and executable by the main processor 102. The hardware-initialization firmware instructions 308 may include BIOS/EUFI instructions. The hardware-initialization firmware instructions 308 may perform a hardware initialization, test hardware components, load a boot loader from a mass storage to initialize an operating system, provide runtime services to an operating system or application, and provide similar functions to the computing device 300. The hardware-initialization firmware instructions 308 may be implemented as the firmware of computing device 300.

Access to the memory 104 may be controlled by a descriptor 310 stored in the memory 104. The descriptor 310 may define a region of memory 104 available to the firmware subsystem 112 and inaccessible to the main processor 102 or security controller 304. A region of memory 104 inaccessible to the main processor 102 may include a region of the subsystem data 108. The descriptor 310 may be an SPI descriptor, a partition table, or similar.

The security controller 304 may provide security and resiliency functions to the computing device 300 and specifically to the memory 104. The security controller 304 may monitor the memory 104 and detect unauthorized or erroneous modification to content of the memory 104. For example, the security controller 304 may detect and halt an attempt to overwrite boot information of the hardware-initialization firmware instructions 308. The security controller 304 may include an endpoint security controller.

The security controller 304 and the hardware-initialization firmware subsystem 302 may communicate, for example, by message passing or other mechanism.

Portions of the subsystem data 108 may be inaccessible to the security controller 304, as the firmware subsystem 112 may include proprietary or secret information and/or functionality. Further, the firmware subsystem 112 may have an internal verification process to detect and halt an unauthorized or erroneous modification to the subsystem data 108.

Portions of the subsystem data 108, including the recovery information 110, is available to the security controller 304, so that the security controller 304 may determine whether the firmware subsystem 112 lacks integrity. The portions of the subsystem data 108 may be directly available to the security controller 304. As such, the security controller 304 is able to determine the integrity of the firmware subsystem 112.

The computing device 100 further includes a firmware subsystem update 116, which may be stored in a non-volatile memory of the computing device 300, such as memory 104, or another memory. The firmware subsystem update 116 is an update to some or all of the subsystem data 108. The firmware subsystem update 116 may exclude proprietary information that is protected on firmware subsystem 112.

The secure memory 306 is connected to the security controller 304 and may store instructions and data for use by the security controller 304. The secure memory 306 is a non-transitory computer-readable medium that includes non-volatile memory, such as EEPROM, flash memory, or similar type of memory that is capable of preserving content without external power.

The secure memory 306 may store a recovery information backup 114. The recovery information backup 114 is a copy of some or all of the recovery information 110. The recovery information backup 114 may include recovery instructions and related data from the recovery information 110 sufficient to initialize recovery of the firmware subsystem 112. The recovery information backup 114 may exclude proprietary information that is protected on firmware subsystem 112. The recovery information backup 114 may be smaller in memory, and in some examples significantly smaller in memory, than the firmware subsystem update 116.

The secure memory 306 may store recovery coordination instructions 118 executable by the security controller 304 to determine integrity of the recovery information 110 as stored on the memory 104. The recovery coordination instructions 118 may further be executed to, in response to determining that the recovery information 110 lacks integrity, initiate recovery of the firmware subsystem 112 using the recovery information backup 114, and perform recovery of the firmware subsystem 112 using the firmware subsystem update 116. The firmware subsystem update 116 may include a set of update instructions executable by the main processor 102 to perform the recovery of the firmware subsystem 112.

The computing device 300 may further include a user interface 312, which may include a keyboard, mouse, trackpad, display, speaker, or similar component. The user interface 312 may be coupled to the main processor 102. The recovery coordination instructions 118 may further generate an indication of an intrusion to the subsystem data 108 when the subsystem data 108 is determined to lack integrity. An example intrusion indication is a text string displayed to the user or saved in a log. As such, a user may be made aware of the potential intrusion and resulting recovery of the firmware subsystem 112.

The recovery coordination instructions 118 may further generate the recovery information backup 114 of the recovery information 110 and store the recovery information backup 114 of the in the secure memory 306 at end of manufacture of the computing device 300 which may be assumed to be a safe copy of the recovery information 110.

The recovery coordination instructions 118 may further determine whether the firmware subsystem update 116 includes an update to recovery information 110. Where there is an update to recovery information 110, the recovery coordination instructions 118 may further update the recovery information backup 114 with the updated recovery information 110.

Figure 4:
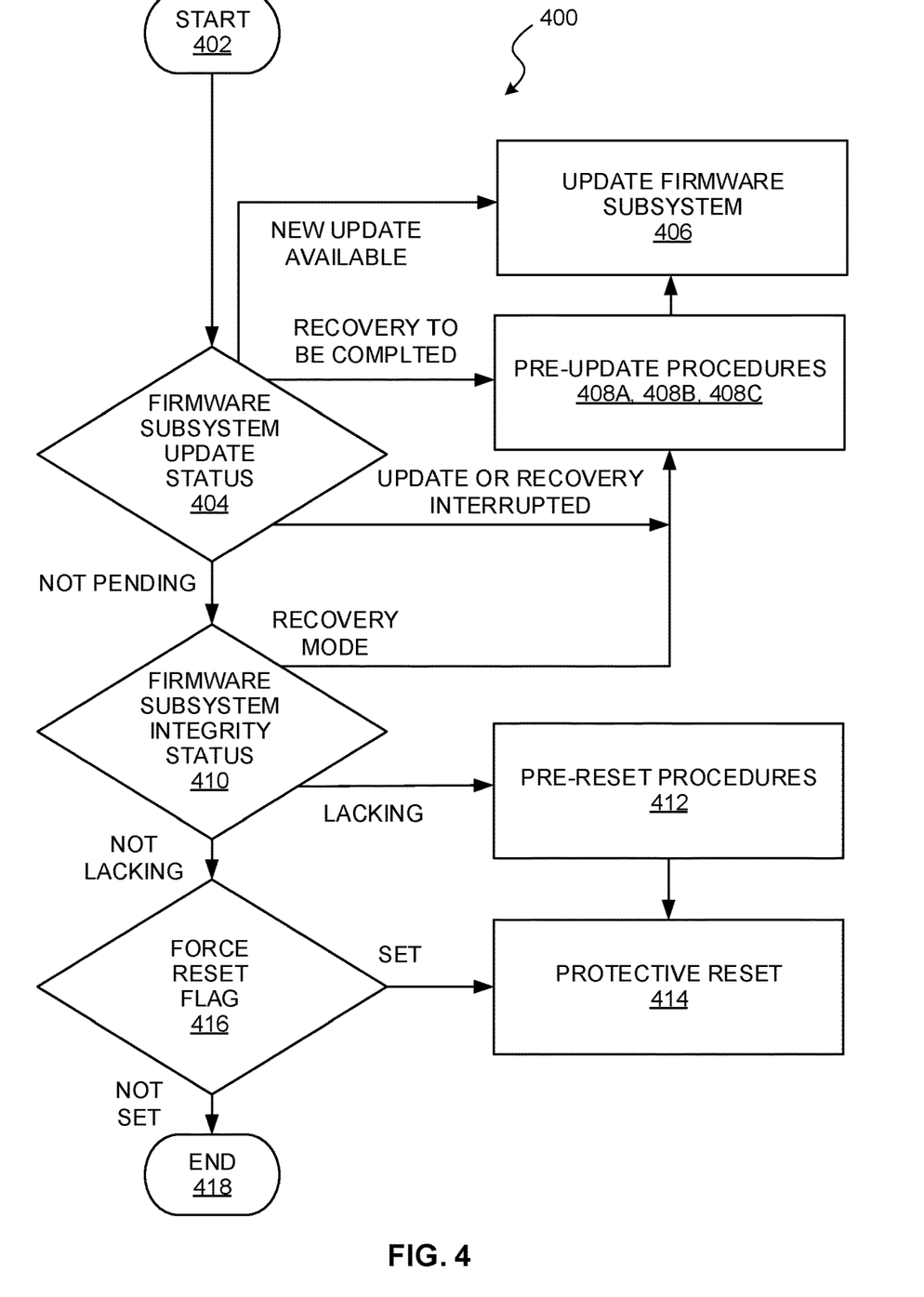
FIG. 4 is a flowchart of an example method to check firmware subsystem update status and firmware subsystem integrity at bootup of a computing device.

FIG. 4 is a flowchart of an example method 400 to check firmware subsystem update status and firmware subsystem integrity before or at bootup of a computing device. The method 400 may be performed by a computing device as discussed herein, such as the computing device 100 of FIG. 1, or the computing device 300 of FIG. 3. The method 400 may be embodied by a set of executable instructions that may be stored in a non-transitory computer-readable medium, where portions of such instructions may be executable by a security controller. The method begins at block 402 at bootup of the computing device.

At block 404, the status of a firmware subsystem update is determined. A status may indicate that a firmware subsystem update is pending because of, for example, a new update is available, recovery has been initiated and full recovery is to be performed, or an update has been interrupted. A status may also indicate that no update is pending.

If there is a new firmware subsystem update, the new firmware subsystem is updated at block 406. The firmware subsystem may be updated by a main processor of the computing device. Further details of the application of an update of the firmware subsystem is provided in greater detail below with reference to method 500 of FIG. 5.

If a status indicates that recovery of the firmware subsystem has been initiated and that full recovery is to be performed, pre-update procedures are initiated at block 408A, followed by updating of the firmware subsystem at block 406 to perform recovery of the firmware subsystem. At block 408A, an indication that recovery has been initiated and that full recovery of the firmware subsystem is to be performed may be generated, and may be logged and/or displayed to a user through a user interface. Further, it may be determined whether an update to the firmware subsystem is available, and where available, the update may be prepared to be used for full recovery, and where not available, the lack of availability of the update may be logged.

If a status indicates that a firmware subsystem update was interrupted, such as during the course of an interrupted firmware subsystem recovery or during the course of a normal update, pre-update procedures are initiated at block 408B, followed by updating of the firmware subsystem at block 406 to perform recovery of the firmware subsystem. At block 408B, the interruption may be logged. Further, the partly updated portion of the firmware subsystem may be deleted. Further, a log that the firmware subsystem is to be fully recovered may be made. Further, it may be determined whether an update to the firmware subsystem is available, and where available, the update may be prepared to be used for recovery, and where not available, the lack of availability of the update may be logged.

If a status indicates that an update to the firmware subsystem is not pending, that is, where there is no new update available, where recovery has not been initiated, and where an update has not been interrupted (e.g. where an update has been completed), then the firmware subsystem update status is determined to be not pending, and a check of the firmware subsystem integrity is conducted at block 410.

At block 410, the status of the integrity the firmware subsystem is determined. If the firmware subsystem is in recovery mode, pre-update procedures are initiated at block 408C, and updating of the firmware subsystem is conducted at block 406 to perform recovery of the firmware subsystem. At block 408C, a log that the firmware subsystem is to be fully recovered from an update may be made. Further, it may be determined whether an update to the firmware subsystem is available, and where available, the update may be prepared to be used for recovery, and where not available, the lack of availability of the update may be logged.

If the firmware subsystem integrity is determined to be lacking, pre-reset procedures are conducted at block 412, followed by protective reset at block 414. Further details of a protective reset is provided in greater detail below with reference to method 600 of FIG. 6. At block 412, a reason for the lack of integrity may be logged (e.g. a portion of the subsystem data is corrupted). Further, it may be determined whether an update to the firmware subsystem is available, and where available, a protective reset may be initiated, and where not available, continuation of normal boot procedures may be attempted.

At block 416, it is determined whether a flag to force reset of the computing device is set. If a flag to force reset is set, protective reset is initiated at block 414. If a flag to require reset is not set, the method 400 is ended at block 418, with continuation of normal bootup procedures.

Figure 5:
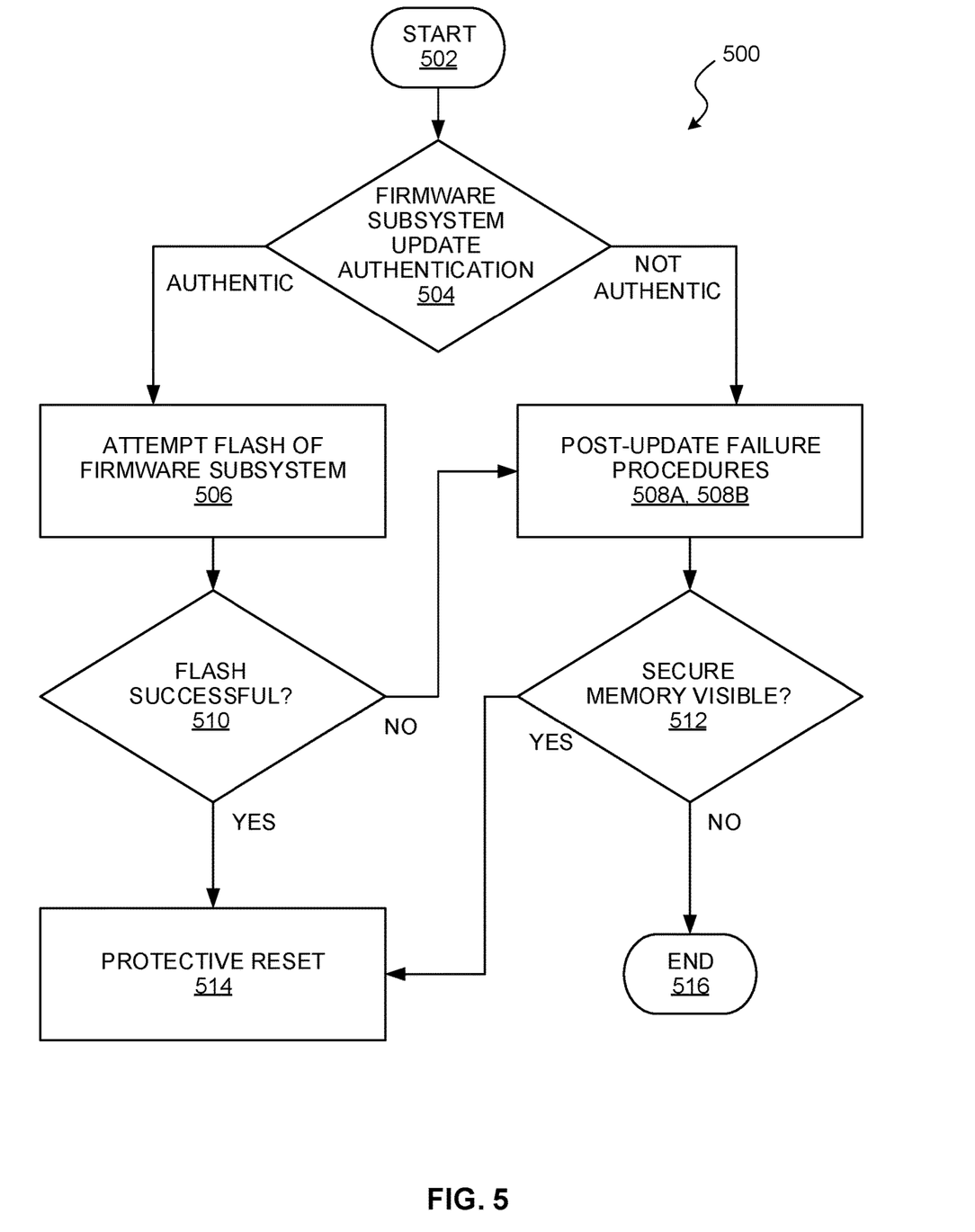
FIG. 5 is a flowchart of an example method to apply an update of a firmware subsystem to a computing device.

FIG. 5 is a flowchart of an example method 500 to apply an update of a firmware subsystem to a computing device. The method 500 may be performed by a computing device as discussed herein, such as the computing device 100 of FIG. 1, or the computing device 300 of FIG. 3. The method 500 may be embodied by a set of executable instructions that may be stored in a non-transitory computer-readable medium, where such instructions may be executable by a security controller. The method begins at block 502.

At block 504, it is determined whether the update to the firmware subsystem is authentic. Verifying the authenticity of the update may involve verifying a cryptographic signature, hash, or secret. If the update is determined to be authentic, an attempt to flash the firmware subsystem with the update is attempted at block 506. If the update is not determined to be authentic, post-update failure procedures are initiated at block 508A. At block 508A, failure to authenticate the update may be logged. Further, a user may be notified of the failure through a user interface.

At block 506, an attempt to flash the firmware subsystem with the authenticated update is made. At block 510, it is determined whether the flash was successful. Determination of whether the flash was successful may be made based on a response from the firmware subsystem. If the flash is determined to have been successful, a log of the successful flash may be made. Thus, where a new update to the firmware subsystem is available to be applied, the new update is applied. Where application of the new update was successful, a flag is generated to indicate that the new update is to be backed up to be used as the update to perform recovery of the firmware subsystem.

After successful application of the new update, a protective reset is conducted at block 514. The protective reset at block 514 is similar to the protective reset at block 414 and is described in greater detail below with reference to method 600 of FIG. 6. If the flash is not determined to have been successful, post-update failure procedures may be initiated at block 508B. At block 508B, a log of the failure of the flash may be made. Further, a user may be notified of the failure through a user interface.

At block 512, after post-update failure procedures at blocks 508A, 508B, it is determined whether a secure memory is visible. If the secure memory is visible, it may be considered that it is not safe to proceed with a normal booting process, and a protective reset may be conducted at block 514, with the indication that recovery of the firmware subsystem is to be skipped during the next boot. If the secure memory is not visible, it may be considered safe to proceed with the normal booting process, and the method 500 may be ended at block 516.

Figure 6:
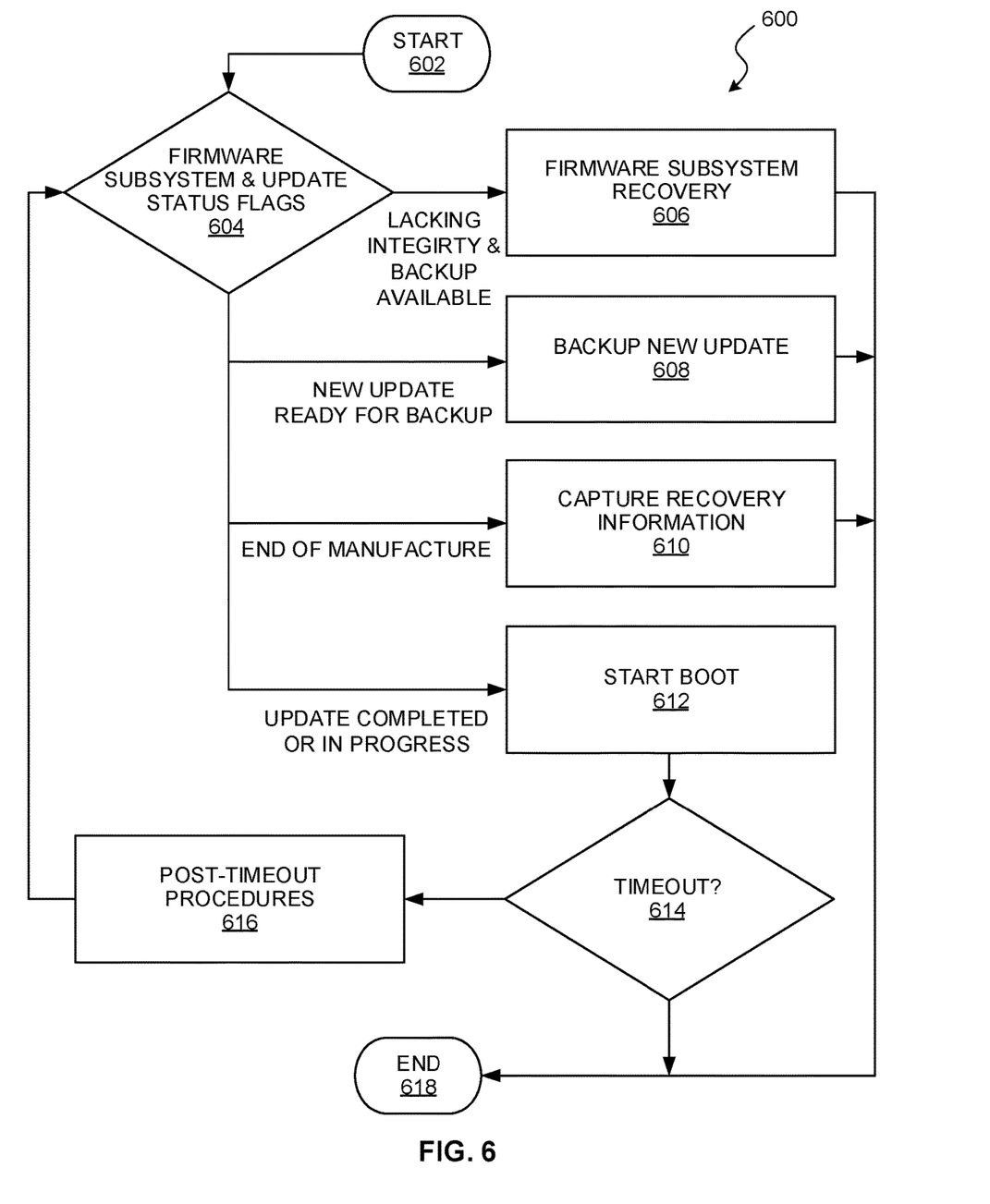
FIG. 6 is a flowchart of an example method to protectively reset a computing device having a firmware subsystem.

FIG. 6 is a flowchart of an example method 600 to protectively reset a computing device. The method 600 may be performed by a computing device as discussed herein, such as the computing device 100 of FIG. 1, or the computing device 300 of FIG. 3. The method 600 may be embodied by a set of executable instructions that may be stored in a non-transitory computer-readable medium, where such instructions may be executable by a security controller. The method begins at block 602.

At block 604, firmware subsystem and firmware subsystem update status flags are checked.

If status flags indicate that the firmware subsystem is lacking integrity and a firmware subsystem backup is available, firmware subsystem recovery is initiated at block 606, and the method 600 may end in continuation of normal booting process at block 618. Firmware subsystem recovery at block 606 may be similar to blocks 206 and 208 of method 200 of FIG. 2. Further, upon performance of full recovery, a log of full recovery of the firmware subsystem may be made.

If a status flag indicates that a new update to the firmware subsystem is ready to be backed up, the new update is backed up at block 608. Further, backup of the new update may be logged. Thus, when a new update was successfully applied at last boot, the new update is backed up to be used as the update to perform recovery of the firmware subsystem.

If a status flag indicates that the computing device transitioned to an end-of-manufacture state at the last boot, a backup of recovery information is captured at block 610. Further, capture of the end-of-manufacture recovery information may be logged.

If a status flag indicates that an update to the firmware subsystem has completed or is in progress, a normal booting process is started at block 612. At block 614, it is determined whether a timeout duration has expired. If the timeout expires, post-timeout procedures are initiated at block 616. At block 616, the timeout is logged, integrity of the current update to the firmware subsystem is checked, and reset procedures are restarted at block 604. If the timeout is not expired, the computing device continues with the normal booting process at block 618 and the method 600 is ended.

In view of the above, it should be apparent that the integrity of recovery information for a firmware subsystem may be determined, and, in response to a determinization that the recovery information lacks integrity, the firmware subsystem may be recovered by initiating recovery of the firmware subsystem using a backup of the recovery information and performing recovery of the firmware subsystem using an update to the firmware subsystem. Thus, the capability of a firmware subsystem to be recovered may be protected using little secure storage space while maintaining the proprietary nature of information on the firmware subsystem.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing device comprising:
 a main processor;
 a firmware subsystem;
 a controller to control operation of the firmware subsystem of the computing device, wherein the controller is separate from the main processor of the computing device;
 memory to store subsystem data that is useable by the controller, the subsystem data including recovery information executable by the controller to initiate recovery of the subsystem; and
 recovery coordination instructions to:
  determine integrity of the recovery information as stored on the memory;
  in response to determining that the recovery information lacks integrity:
   initiate recovery of the firmware subsystem using a backup of the recovery information; and
   perform recovery of the firmware subsystem using an update to the firmware subsystem; and
  at reset of the computing device, determine whether a new update to the firmware subsystem was successfully applied on last boot, and upon determining that a new update to the firmware subsystem was successfully applied on last boot, back up the new update to be used as the update to perform recovery of the firmware subsystem.

2. The computing device of claim 1, wherein the main processor is to control operation of the computing device, the computing device comprises a secure memory isolated from the main processor to store the backup of the recovery information and the recovery coordination instructions, and the computing device comprises an endpoint security controller to execute the recovery coordination instructions.

3. The computing device of claim 1, wherein the recovery coordination instructions are further to capture the backup of the recovery information at end of manufacture of the computer device.

4. The computing device of claim 1, wherein the recovery coordination instructions are to determine integrity of the recovery information before the computing device is reset, shut down, or hibernated.

5. The computing device of claim 1, wherein the recovery coordination instructions are further to update the backup of the recovery information when the subsystem data is updated.

6. The computing device of claim 1, wherein the subsystem data comprises a set of subsystem instructions and data that are useable by the controller and unusable by the main processor of the computing device.

7. A non-transitory computer-readable medium comprising instructions to:
 determine integrity of recovery information of a firmware subsystem of a computing device, the recovery information including recovery instructions and related data to initialize recovery of the firmware subsystem;
 in response to determining that the recovery information lacks integrity, initiate recovery of the firmware subsystem using a backup of the recovery instructions and related data, and perform recovery of the firmware subsystem using an update to the firmware subsystem; and
 at reset of the computing device, determine whether a new update to the firmware subsystem was successfully applied on last boot, and upon determining that a new update to the firmware subsystem was successfully applied on last boot, back up the new update to be used as the update to perform recovery of the firmware subsystem.

8. The non-transitory computer-readable medium of claim 7, wherein the instructions are further to capture the backup of the recovery information at end of manufacture of the computer device.

9. The non-transitory computer-readable medium of claim 7, wherein the instructions are further to, at boot up of the computing device, determine whether a new update to the firmware subsystem is available to be applied, apply the new update, determine whether application of the new update was successful, and where application of the new update was successful, flag that the new update is to be backed up to be used as the update to perform recovery of the firmware subsystem.

10. The non-transitory computer-readable medium of claim 7, wherein the instructions are further to, prior to performing recovery of the firmware subsystem using the update to the firmware subsystem, authenticate the update.

11. The non-transitory computer-readable medium of claim 7, wherein the instructions are further to determine integrity of the recovery information before the computing device is reset, shut down, or hibernated.

12. A computing device comprising:
a main processor;
a firmware subsystem including a firmware controller and memory, wherein the firmware controller is separate from the main processor, wherein the memory is to store instructions and data of the firmware subsystem, wherein the instructions and data of the firmware subsystem are inaccessible to the main processor, wherein the firmware subsystem further includes recovery instructions to initiate recovery of the firmware subsystem;
a security controller to:
determine integrity of the recovery instructions;
in response to determining that the recovery instructions lack integrity, initiate recovery of the firmware subsystem using a backup of the recovery instructions, and perform recovery of the firmware subsystem using an update to the firmware subsystem; and
at reset of the computing device, determine whether a new update to the firmware subsystem was successfully applied on last boot, and upon determining that a new update to the firmware subsystem was successfully applied on last boot, back up the new update to be used as the update to perform recovery of the firmware subsystem.

13. The computing device of claim 12, wherein the computing device comprises a secure memory isolated from the main processor to store the backup of the recovery instructions and the recovery coordination instructions.

14. The computing device of claim 12, further comprising a hardware-initialization firmware subsystem including instructions stored in the memory and executable by the main processor.

* * * * *